United States Patent
Ozturk et al.

(10) Patent No.: US 7,978,846 B2
(45) Date of Patent: Jul. 12, 2011

(54) SCALE-INVARIANT BARRETT REDUCTION FOR ELLIPTIC-CURVE CYRPTOGRAPHY

(75) Inventors: Erdinc Ozturk, Worcester, MA (US); Vinodh Gopal, Westboro, MA (US); Gilbert Wolrich, Framingham, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 1046 days.

(21) Appl. No.: 11/772,169

(22) Filed: Jun. 30, 2007

(65) Prior Publication Data
US 2009/0003595 A1    Jan. 1, 2009

(51) Int. Cl.
H04K 1/00    (2006.01)
H04L 9/00    (2006.01)
H04L 9/28    (2006.01)
H04L 9/30    (2006.01)
G06F 7/72    (2006.01)

(52) U.S. Cl. ............ 380/30; 380/28; 380/46; 708/490; 708/491; 708/492; 708/518; 708/523; 708/525

(58) Field of Classification Search .............. 380/30
See application file for complete search history.

(56) References Cited

U.S. PATENT DOCUMENTS

| | | | | |
|---|---|---|---|---|
| 6,141,786 | A * | 10/2000 | Cox et al. | 714/763 |
| 7,080,109 | B2 * | 7/2006 | Koc et al. | 708/491 |
| 7,590,235 | B2 * | 9/2009 | Hubert | 380/30 |
| 7,702,105 | B1 * | 4/2010 | Gura et al. | 380/255 |
| 2003/0081771 | A1 * | 5/2003 | Futa et al. | 380/30 |
| 2005/0105723 | A1 * | 5/2005 | Dupaquis et al. | 380/59 |
| 2005/0267926 | A1 * | 12/2005 | Al-Khoraidly et al. | 708/492 |
| 2007/0116270 | A1 * | 5/2007 | Fischer | 380/30 |
| 2007/0168411 | A1 * | 7/2007 | Hubert | 708/492 |
| 2008/0025502 | A1 * | 1/2008 | Kounavis et al. | 380/30 |
| 2009/0285386 | A1 * | 11/2009 | Takashima | 380/28 |

OTHER PUBLICATIONS

Guajardo, J., et al. 'Efficient Hardware Implementation of Finite Fields with Applications to Cryptography', Sep. 26, 2006, © Springer Science, entire document, http://www.crypto.rub.de/imperia/md/content/texte/publications/journals/efficient_hard_finitef.pdf.*
A. Menezes, "Efficient Implementation", Handbook of Applied Cryptography, Chapter 14, 1997, pp. 591-634.
M. Brown et al., "Software Implementation of the NIST Elliptic Curves Over Prime Fields", Lecture Notes in Computer Science; vol. 2020, Proceedings of the 2001 Conference on Topics in Cryptology: The Cryptographer's Track at RSA, Springer Verlang, 2001, pp. 250-265.
Certicom Corp., Standards for Efficient Cryptography, "SEC 1: Elliptic Curve Cryptography", Version 1.0, Sep. 20, 2000, 96 pages.
Hasenplough, W., et al., "Fast Modular Reduction", 18th IEEE Symposium on Computer Arithmetic, 2007 (Arith '07), Jun. 25-27, 2007, pp. 225-229.
Office Action received for German Patent Application 102008030586.3, mailed on Nov. 2, 2009, 5 pages of German Office Action and 5 pages of English Translation.

* cited by examiner

*Primary Examiner* — Christian LaForgia
*Assistant Examiner* — Ronald Baum
(74) *Attorney, Agent, or Firm* — Caroline M. Fleming

(57) ABSTRACT

The computation time to perform scalar point multiplication in an Elliptic Curve Group is reduced by modifying the Barrett Reduction technique. Computations are performed using an N-bit scaled modulus based a modulus m having k-bits to provide a scaled result, with N being greater than k. The N-bit scaled result is reduced to a k-bit result using a pre-computed N-bit scaled reduction parameter in an optimal manner avoiding shifting/aligning operations for any arbitrary values of k, N.

18 Claims, 6 Drawing Sheets

SCALE-INVARIANT BARRETT REDUCTION FOR ELLIPTIC-CURVE CYRPTOGRAPHY

FIELD

This disclosure relates to public key cryptography and in particular to elliptic curve cryptography.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems use 1024-bit parameters for RSA and DH.

The Elliptic Curve Cryptosystem (ECC) is a relatively new public key algorithm that is based on the arithmetic of elliptic curves. ECC provides the same level of security as RSA and DH but uses parameters having fewer bits than parameters used by RSA or DH. For example, to authenticate an 80-bit key, 1024-bit parameters are recommended for the RSA and DH public key algorithms and 160-bit parameters are recommended for the ECC algorithm. For a 128-bit key 3072-bit parameters are recommended for the RSA and DS public key algorithms and 224-bit parameters are recommended for the ECC algorithm.

Elliptic curve cryptography (ECC) provides more security than traditional cryptosystems based on integer fields for much smaller key-sizes. It is very efficient from the perspectives of computes, power, storage and bandwidth to transmit keys. It scales much better than the traditional schemes and is therefore likely to gain more popularity with increased need for higher security strengths. Elliptic curves are algebraic/geometric objects that have been extensively studied by mathematicians. These curves can be applied to cryptography by suitably defining the underlying field and constraining the parameters such that the points on the curve form a Group (suggested in 1985 independently by Neil Koblitz and Victor Miller).

Elliptic curves for cryptographic applications are defined over prime fields (Galois Field Prime (GFP)) and binary fields (Galois Field Binary (GF2m)) GFP and GF2m both have a finite number of points that form a mathematical Group structure. The points can be operated on by special "addition" or "subtraction" operations. For any two points P1 and P2 in the group: P3=P1+P2 is defined. After point-addition has been defined, the basic building blocks of any cryptosystem are computations of the form Q=[k]P. The operation [k]P may be referred to as scalar point multiplication. This can be defined as P added to itself (k−1) times. Note that 1<=k<ord(P), where "ord" is defined as the order of the element of the group. Given P and [k]P, it is computationally infeasible to recover k.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
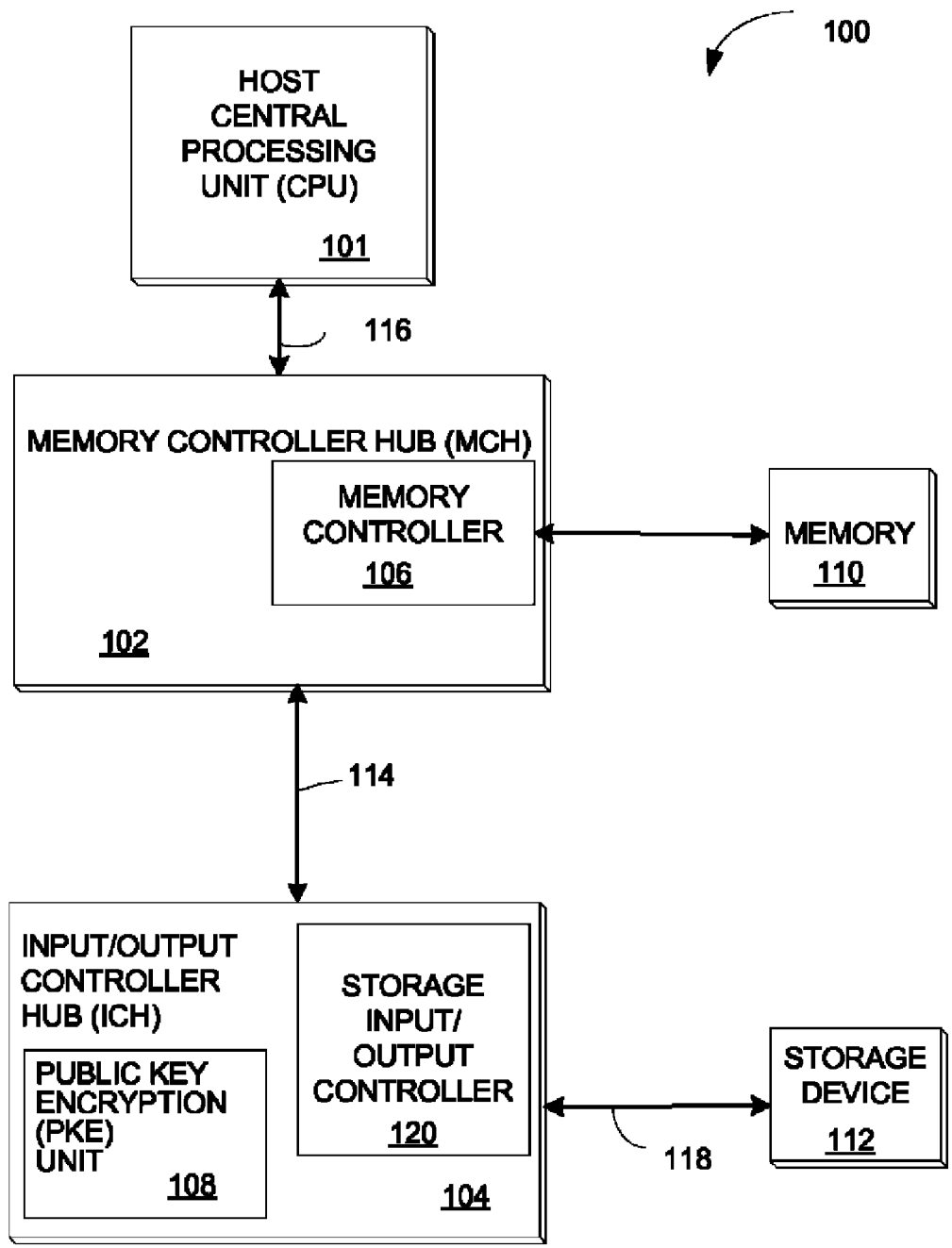
FIG. 1 is a block diagram of a system that includes an embodiment of a Public Key Encryption (PKE) unit to perform computations for ECC.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Federal Information Processing Standard (FIPS) 186-3 describes standard National Institute of Standards and Technology (NIST) elliptic curves. For example, there are standard NIST ECC curves for prime field sizes of 192, 224, 256, 384 and 521 bits and for binary field sizes of 163, 233, 283, 409 and 571 bits.

An ECC computation involves modular arithmetic operations on an elliptic curve over a finite field. A finite field consists of a finite set of elements. Modular addition and multiplication operations may be performed on pairs of field elements. There is one finite field containing q elements if and only if q is a power of a prime number. A prime finite field is a field with q=p, where p is an odd prime.

The elements of the prime finite field may be represented by the set of integers $\{0, 1, \ldots, p-1\}$ with addition defined as a+b=r mod p. The "mod p" refers to addition modulo p where r is the remainder when the integer a+b is divided by p. Multiplication is defined as a·b=s mod p.

Many of the standard NIST field sizes are not a multiple of 8-bits, for example, the NIST P-521 curve. Thus, in a system having a data path that is a multiple of 8-bits, multiple shift operations are required to align operands (a, b) and the result of modular multiplication.

For example, in a system having a 64-bit data path, the alignment of operands requires a significant amount of shifting, which uses a significant number of compute cycles. If the operands (a, b) of the modular multiplication are scaled to align the operands (a, b) to the 64-bit data path, the number of shift operations is reduced but the number of shift operations is still a significant percentage of the compute cycles.

For example, if operands A and B are both 300 bits, the product of A×B is 600 bits. In a system with a 64-bit data path, the 600 bit product is not aligned to a 64-bit word. This involves 24 (600−576) single-bit shift vectors in order to align to a 64-bit word which increases the number of compute cycles to perform modular multiplication.

Barrett Reduction is a reduction technique that is used to reduce the result of a scalar point multiplication to compute r=x mod m, given x and m. However, a large number of shifting and multiply operations is required to extract and align various subvectors for field sizes that are less than the multiplier hardware word-size. Furthermore, Barrett's reduction cannot be applied in the case in which a number of bits in the operand (for example, a, b) is less than half the number of bits of the modulus m. Thus, typically a system only performs Barrett Reduction for a selected one of the standard NIST ECC curves, for example, a system may only provide support for performing Barrett Reduction for NIST-192.

In an embodiment of the present invention, the number of shifting and multiply operations required for prime (integer) and binary field sizes that are less than the multiplier hardware word-size is reduced. In one embodiment, Barrett Reduction (to compute r=x mod m, given x and m) is modified to avoid shifting and to optimize multiplication operations for a large range of operand sizes. In another embodiment, the number of shifting and multiplication operations is reduced to perform the final transformation after modulus scaling. Furthermore, the modulus size may be arbitrary and performance is similar to the performance of the standard Barrett Reduction.

This results in significant performance increase and reduction in program code complexity. In addition, the technique may be applied to modular exponentiation and modular reductions in general such as in RSA/DSA protocols.

FIG. 1 is a block diagram of a system 100 that includes an embodiment of a Public Key Encryption (PKE) unit 108 to perform computations for ECC. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 110. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
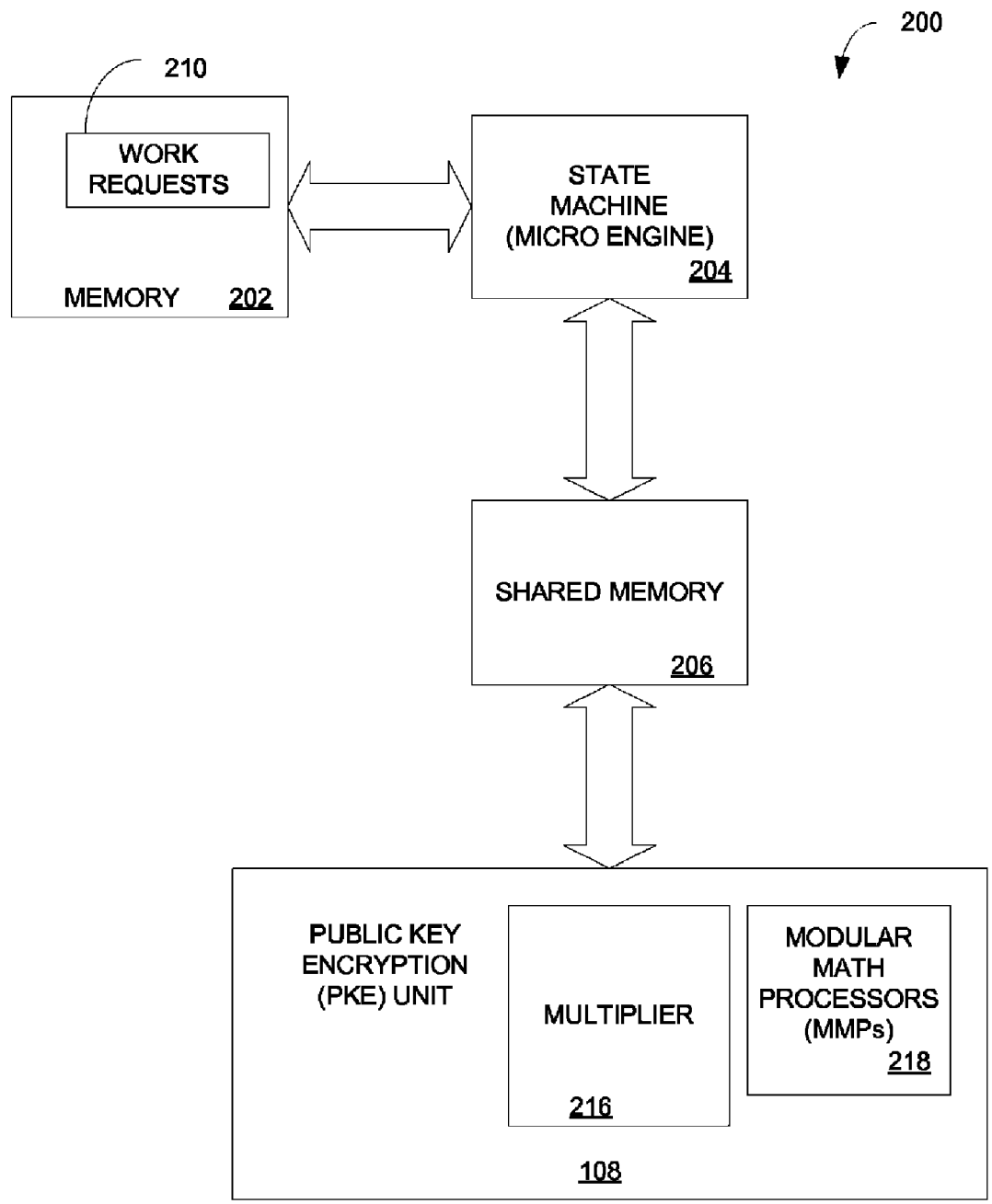
FIG. 2 is a block diagram of an embodiment of a system that includes a public key encryption (PKE) unit.

FIG. 2 is a block diagram of an embodiment of a system 200 that includes a public key encryption (PKE) unit 108.

The system 200 includes a memory 202 for storing work requests 210 and a state machine (micro engine) 204 which processes the work requests 210. The state machine 204 issues instructions to the PKE unit 108 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory 200, the state machine 204 may offload computationally expensive operations in Diffie-Hellman key exchange (DH), Digital Signature Algorithm (DSA) digital signature, Rivest, Shamir, Adleman (RSA) encryption/decryption and primality testing to the PKE unit 108.

The PKE unit 108 includes one or more modular math processors (MMP) 218 and a multiplier 216. The PKE unit 208 may perform modular arithmetic on large numbers. An example of modular arithmetic is a modular exponential operation such as, $g^e$ mod m where g is the base, e is the exponent and m is the modulus.

Figure 3:
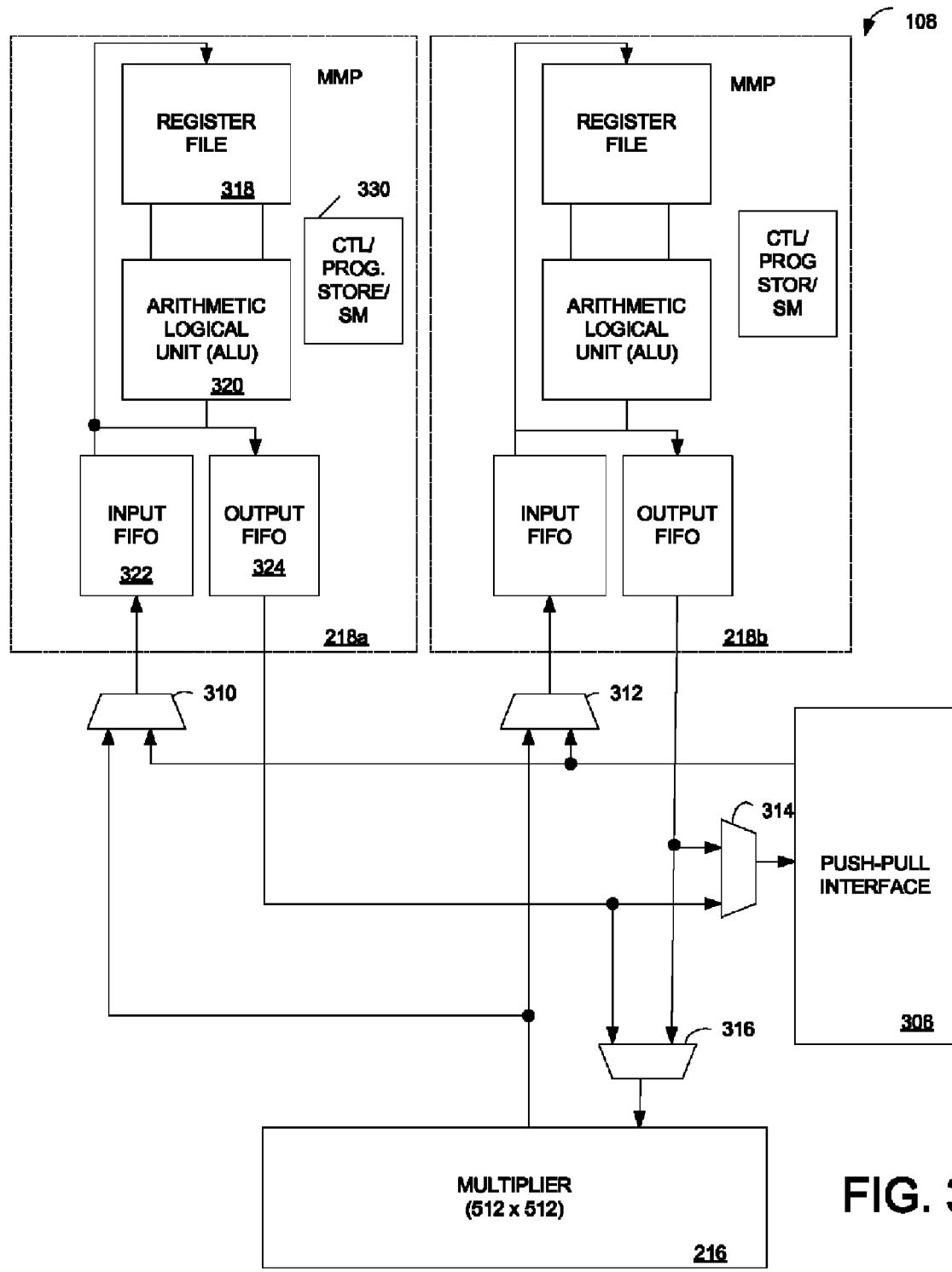
FIG. 3 is a block diagram of an embodiment of the PKE unit shown in FIG. 2.

FIG. 3 is a block diagram of an embodiment of the PKE unit 108 shown in FIG. 2. In the embodiment shown, the PKE unit 108 includes two modular math processors (MMPs) 218a, 218b. However, the PKE unit 108 is not limited to two MMPs 218a, 218b, in other embodiments, the PKE unit 108 may have more than two MMPS.

The PKE unit 108 performs computationally expensive mathematical computations such as modular exponentiation, division and greatest common divisor (gcd). The PKE unit 108 also includes a multiplier 216, which is shared by the MMPs 218a, 218b. In the embodiment shown, the multiplier 216 is a 512×512 multiplier.

Each MMP 218a, 218b includes a respective input First In First Out (FIFO) 322 and an output FIFO 324. The communication path through each MMP 218a, 218b is through the FIFOs 322, 324. Data is enqueued to the input FIFO 322 and dequeued from the output FIFO 324. The states of the MMPs 218a, 218b are independent from each other. Each MMP 218a, 218b may be concurrently transferring data to/from shared memory 206 (FIG. 2) through a push-pull interface 306.

The multiplier 216 may be accessed by the MMPs 218a, 218 b via an internal PKE bus and an arbitration mechanism that includes multiplexers 310, 312, 314 and 316 and associated multiplexer control logic (not shown). As the multiplier 216 is shared by the MMPs 218a, 218b, the multiplexer control logic controls which MMP 218a, 218b is currently using the multiplier 216.

The operand size for each MMP 218a, 218b is configurable through control logic/program store/state machine 330. In one embodiment the operand size may be configured to be 256 or 512 bits. The type of multiply operation is also configurable. In one embodiment, the type of multiply operation performed by the multiplier 216 for a particular MMP 218a, 218b may be unsigned integer or Galois Field (carry-less). Based on the configured operand size and multiply operation for a particular MMP 218a, 218b, the MPP 218a, 218b operates on the required length result vectors without explicit command encodings. For example, the control store 330 of one of the MMPs 218a, 218b may be configured to perform scalar point multiplication for all prime field sizes<521 bits.

The single shared multiplier 216 may operate in one mode with MMP 218a and another mode with MMP 218b in an interleaved fashion. For example, MMP 218a may perform a binary ECC operation on binary field size of 233 bits, thus requiring the multiplier to be set in 256 bits, Galois Field ({256 b, GF*}) mode. MMP 218b may be operating on 384-bit prime field size, requiring the multiplier to be set in 512 bit, integer ({512 b, int*}) mode; these operations are supported concurrently. Furthermore, each MMP 218a, 218b may be configured to perform one of a plurality of reduction techniques, such as, Barrett Reduction or Montgomery Reduction to perform scalar point multiplication.

According to an embodiment of the present invention, a generic modulus scaling technique is provided for reduction techniques. A modulus m having k-bits is scaled to modulus M having N-bits, N being greater than k, with the k-bit operands being treated as N-bits. During intermediate stages of computation using the reduction technique, intermediate results are partially reduced with respect to the scaled modulus M. At the end of the scalar point multiplication operation, the N-bit result is reduced to k-bits.

Figure 4:
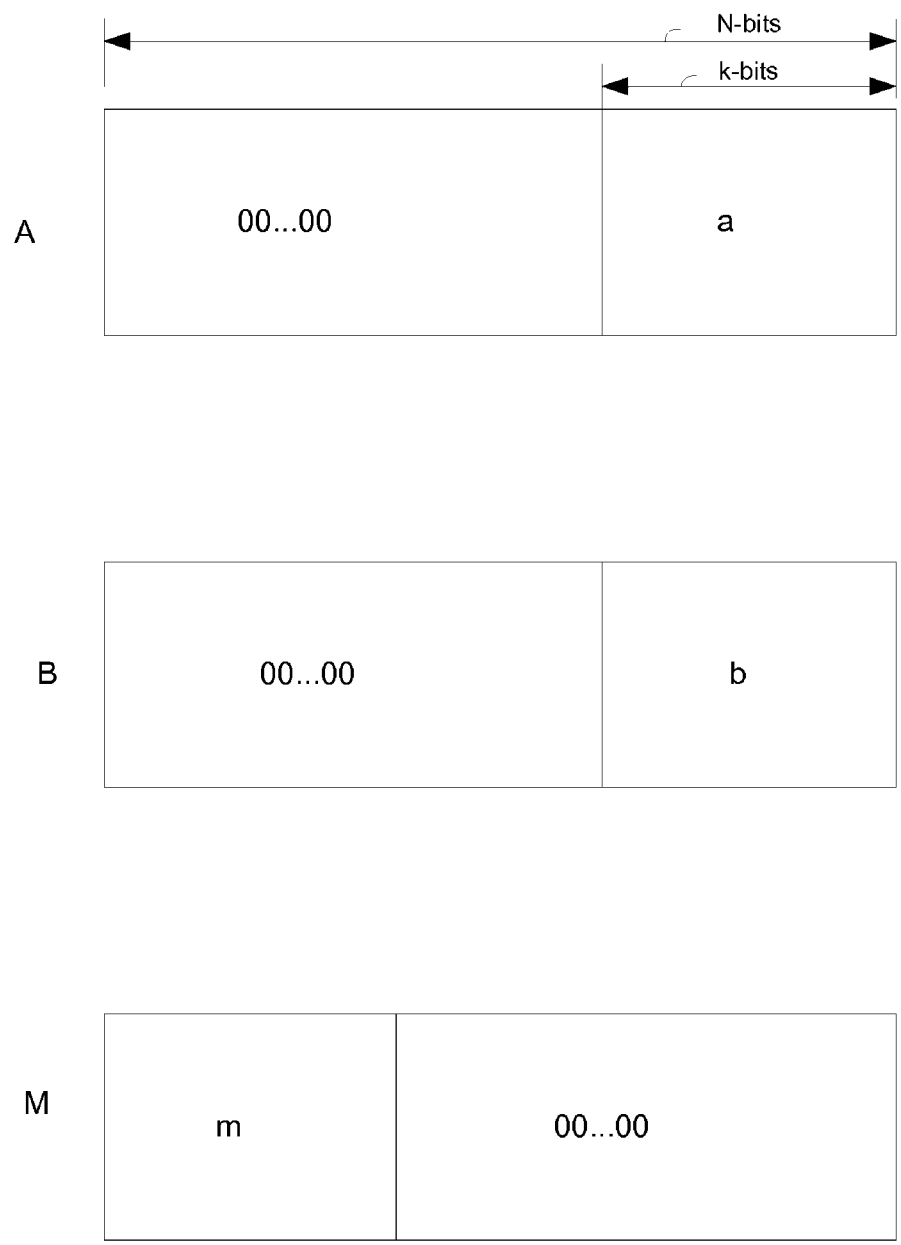
FIG. 4 is a block diagram illustrating a modulus (m) and operands (a, b) for use in a modular arithmetic operation.

FIG. 4 is a block diagram illustrating a modulus (m) and operands (a, b) for use in a modular arithmetic operation. The modulus (m) and operands (a, b) each have k-bits. Modulus scaling is provided by scaling the value of k-bit modulus m to N-bits where M is greater than k and N is selected based on multiplier size which is a multiple of the data path size so that it is aligned. The operands are not scaled, but are treated as N-bit operands instead of k-bit operands by adding 00s to the Most Significant Bits (MSBs).

Modulus scaling is performed instead of operand scaling because as ECC computations involve many operands, operand scaling would have to scale many numbers, whereas modulus scaling applies to one number (modulus m). Furthermore, modulus scaling avoids shifting operations during the main computations and allows only one slower final transformation to the non-scaled original modulus may be performed at the end of the scalar point multiplication.

In an embodiment, the bit length of operand values a, b and modulus m is k-bits, k may be one of the NIST-recommended prime or binary field sizes, for example, prime field sizes 192-bits, 224-bits, 256-bits, 384-bits or 521-bits. In one embodiment with a data path size of 64-bits and a 512-bit multiplier, N may be selected to be 512 or 256, that is, a multiple of the data path size (64-bits).

The operands (a, b) are treated N-bits by adding 0s to the Most Significant bits (MSB) that are greater than (k+1) bits of the operands (a, b) to provide N-bit operands (A, B). The modulus (m) is scaled to N-bits by shifting the modulus (m) to the left by N-k bits and setting the N-k Least Significant bits (LSB) of the N-bit scaled modulus M to '0'. In an embodiment in which N is 512-bits, the modulus m is scaled to 512-bits. In another embodiment in which N is 256-bits, the modulus is scaled to 256-bits.

During intermediate stages of computation, intermediate results are partially reduced with respect to the scaled modulus M. At the very end of the computation (the final transformation), the N-bit result is converted back to k-bits.

For example, the result of a scalar point multiplication (r) of operand A by operand B (that is, the remainder upon dividing the product of A·B by m) may be written as follows:

$$r = A \cdot B \bmod m$$

After scaling the modulus m to M, the result (R) (that is, the remainder upon dividing the product of A·B by M) may be written as follows:

$$R = A \cdot B \bmod M$$

where M>m and $M = m 2^P$; where P is the number of zeros added to shift m (multiply by 2)

Having computed R, the result r (the remainder upon dividing the result R by m) may be derived from the Result (R) computed using mod M as follows:

$$r = R \bmod m$$

Thus, to reduce the number of shift operations, the scalar operations are performed with a scaled modulus M and the final result is scaled back to modulus m in the final transformation.

Figure 5:
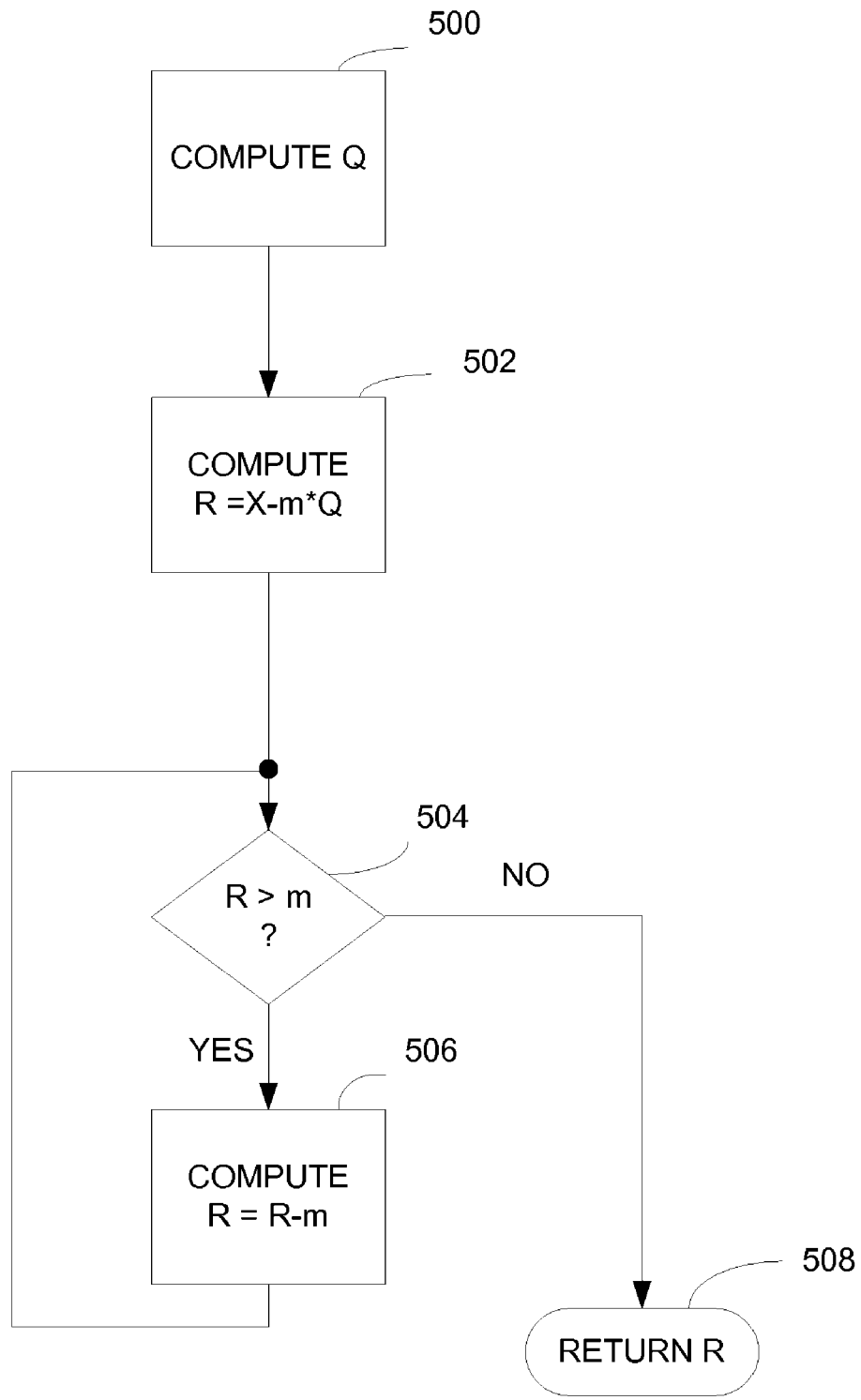
FIG. 5 is a flow chart illustrating an embodiment of a method for reducing a result of a modular arithmetic operation performed with a scaled modulus M to a result based on an original modulus m according to an embodiment of the present invention.

FIG. 5 is a flow chart illustrating an embodiment of a method for reducing a result of a modular arithmetic operation performed with a scaled modulus M to a result based on an original modulus m according to an embodiment of the present invention.

After a result of a modular arithmetic operation has been computed with respect to the scaled modulus M, a final transformation is performed to reduce the result of the scalar multiplication with respect to the original modulus m.

Barrett reduction is a known method for reducing a first number (having 2k bits) modulo a second number (having k bits). Knowing that the k least significant digits of the 2k-bit first number are not necessary to compute a result, only a partial multiple-precision multiplication is necessary using a pre-computed constant $\mu = \text{floor}(b^{2k}/m)$, where b is the radix. If b is 2, then k is the number of bits in the first number and the second number.

Barrett Reduction computes a result r = X mod m as shown below in Table 1 where X, m and μ are positive integers, X has 2k bits, m has k bits and $\mu = \text{floor}(2^{2k}/m)$.

TABLE 1

| |
|---|
| q1 = floor $(X/b^{k-1})$ |
| q2 = q1 * μ |
| q3 = floor $(q2/b^{k+1})$ |
| r1 = X mod $b^{k-1}$ |
| r2 = q3 * mod $b^{k+1}$ |
| r = r1 − r2 |
| if r < 0 then r = r + $b^{k+1}$ |
| while r >= m { r = r − m} |

Barrett reduction shown in Table 1 may be applied to the result of a modular arithmetic operation such as scalar point multiplication with respect to an N-bit scaled modulus M. However, as the number of bits in original modulus m may not be N/2, Barrett reduction requires a large number of bit-shifting operations to extract and align various sub vectors.

Furthermore, Barrett Reduction as shown in Table 1 cannot be applied in the case in which a number of bits in an operand are less than half the number of bits of the modulus. For example, Barrett reduction as shown in Table 1 cannot be applied to a P-192 ECC curve defined by NIST with a scaled modulus M of 512 bits because 192 is less than half of the number of bits in the scaled modulus M, that is, 512/2 (256).

In an embodiment of the invention, the result of the scalar multiplication with respect to the scaled modulus M is reduced to k-bits with respect to the modulus m where m is less than M in order to avoid costly bit-level shifting operations through a scale invariant Barrett Reduction.

Instead of computing $\mu = \text{floor}(b^{2k}/m)$ as required by Barrett Reduction, a scaled reduction parameter g is pre-computed using Equation 1 below:

$$\mu = \text{floor}(2^N/m) \quad \text{Equation 1}$$

The scaled reduction parameter g is used to compute the result (R) and may be computed using regular division which takes a fixed amount of time. The floor function is a mathematical function that returns the largest integer value less than or equal to ($2^N$/m).

Figure 6:
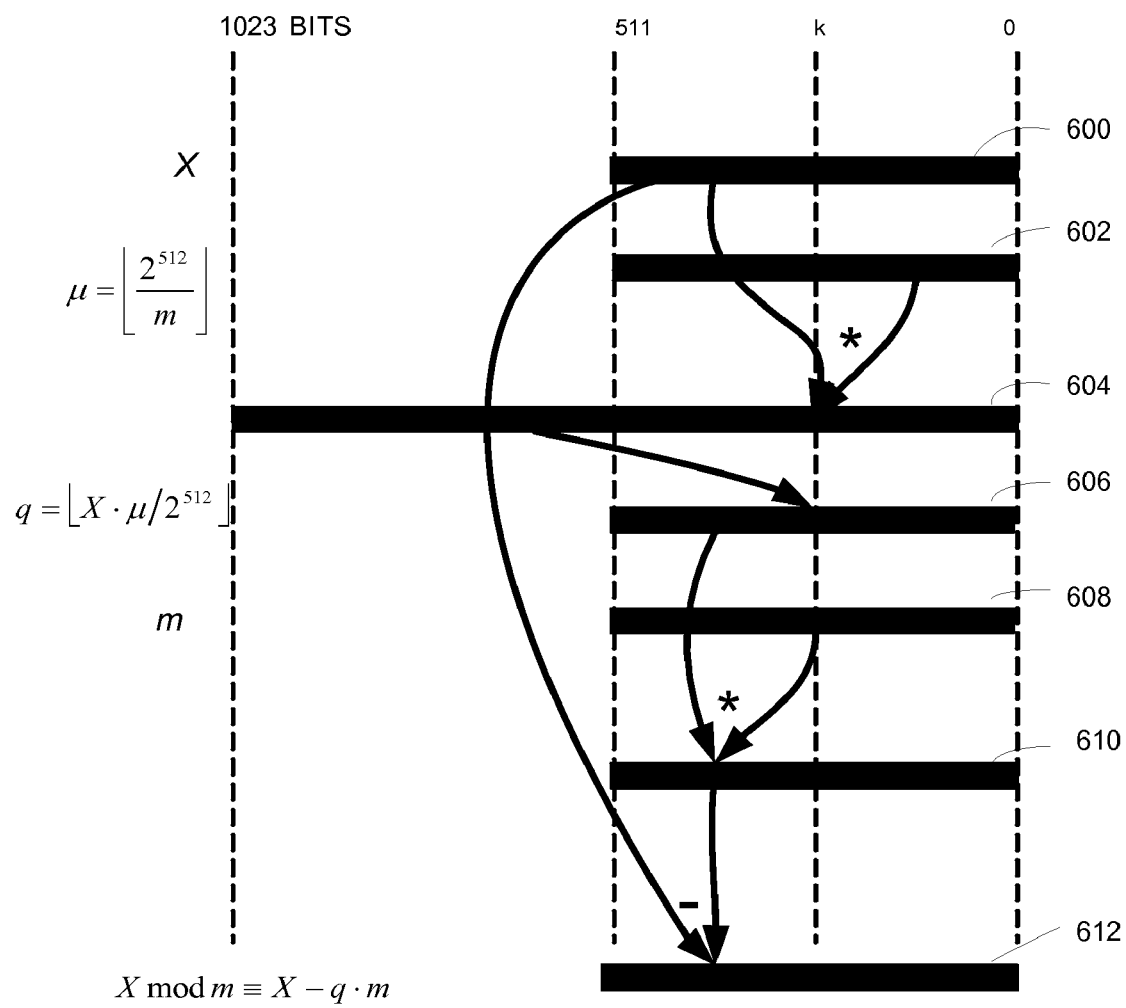
FIG. 6 is a flow diagram illustrating the computations performed for reducing the N-bit result modulo a k-bit modulus m.

FIG. 6 is a flow diagram illustrating the computations performed for reducing the N-bit result modulo a k-bit modulus m. FIG. 6 will be described in conjunction with FIG. 5.

Referring to FIG. 5, at block 500, Q is computed using the pre-computed scaled reduction parameter μ and X which is an N-bit result to be reduced modulo a k-bit modulus m according to Equation 2 below.

$$Q = \text{floor}[(\mu * X)/2^N] \qquad \text{Equation 2}$$

The multiplication operation, that is, μ*X has N-bit operands and results in a 2N-bit product that needs to be reduced to a k-bit result. This enables the number of shift operations in the main computations in the ECC point operation (or a modular exponentiation) to be reduced. This is particularly useful in the context of ECC where field sizes (prime/binary) are not expected to be multiples of 64 (or even 32 in some cases) bits.

Referring to FIG. 6, X is stored at 600 and μ is stored at 602. In the embodiment shown N is 512. The number of bits in μ is dependent on the number of bits in modulo m. For example, if m is 384-bits, N is 512-bits and μ is 128 bits. The result of μ*X (512+128 bits) is stored at 604.

The least significant N-bits of the 2N-bit Q are not needed to compute the result, thus the most significant N-bits of the 2N-bit product of μ*X are selected at 606. In one embodiment, the most significant bits may be selected by using a pointer/scale adjustment in the MMP 218a, 218b to avoid shift operations. For example, the result of the multiply operation is 512*512=1024 bits which is represented as 16 quadwords (64-bits) in memory. Thus, the variable (full result) that points to the result is a quad-word pointer data structure with a reference count of 16. Ignoring the scale adjustment for simplicity, in order to extract the most-significant bits of the full result by skipping over the N least significant bits, a variable top_result is computed by adding 8 (that is, 256 bits (8×64 bits)) to the full result variable. This may be computed using a simple one-cycle instruction with no shifting/aligning required Returning to FIG. 5, at block 502, after Q has been computed at 606 (FIG. 6), the result modulo m is computed iteratively through the use of subtraction operations to provide the remainder (R) mod m. On average the number of iterations is about one in contrast to the use of the standard Barrett Reduction which typically requires 2 or 3 iterations. The initial remainder (R) is computed using equation 3 below:

$$R = X - m*Q \qquad \text{Equation 3}$$

The multiplication operation, that is m*Q is performed with 512 bit operands shown at 606 (FIG. 6) and 608 (FIG. 6). X (at 600) is subtracted from result of the multiplication operation (at 610).

At block 504, the result R is compared with modulus m. The final remainder mod m is computed by subtracting m from the remainder (R) until the remainder is less than m as shown in the code snippet in Table 2 below:

TABLE 2

While (R > m) {R = R - m;}

If result R is greater than modulus m, processing continues with block 506 to subtract modulus m from the result R. If result R is not greater than modulus m, the final result R has been computed, processing is complete.

At block 508, the result R is returned. The computation of the result mod m may be used for integer fields or binary fields. In one embodiment, X is a 512 bit positive integer to be reduced modulo a k-bit modulus m where k is less than 512. In other embodiments M may be $2^k$ with k selected such that the number of bits in M is greater than the number of bits in m.

For example, in an embodiment for a NIST curve having a 384-bit prime field and a 512-bit multiplier, M has 512 bits and m has 384 bits. Thus, substituting $2^{384}$ for m in Equation 1 above, μ is a 128-bit (512−384) value that is stored in a 512-bit field. The modulo 384-bit result is computed from the modulo 512-bit result using the operations shown in Equations 1-4 and Table 2 as discussed in conjunction with FIGS. 5 and 6.

Having pre-computed the 128-bit scaled reduction parameter value μ, the 128-bit μ is multiplied by 512-bit value X in the 512×512 multiplier to provide a 620-bit product. According to Equation 2, the Most Significant 512-bits of the 620-bit product are right shifted by 512-bits such that the Most Significant 128-bits of the 620-bit product are stored in the least significant 512-bits as Q. According to Equation 3, the 128-bit Q is multiplied by the 384-bit modulus m to provide a 512-bit product which is reduced to a 384-bit result by subtracting the 384-bit modulus m until the result is less than the 512-bit value X. This is achieved through the use of a single pointer addition operation, that is, no bit shifting operations are necessary. For example, first, m*Q is subtracted from X, and then m is iteratively subtracted as needed until the resulting remainder is less than m. The remainder after the subtraction operations is the 384-bit result.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
computing, by a public key encryption unit, an N-bit scaled reduction parameter based on a k-bit modulus m, N being greater than k; and
performing a Barrett Reduction using the N-bit scaled reduction parameter on an N-bit scaled result generated using an N-bit scaled modulus to reduce the N-bit scaled result to a k-bit result with respect to the k-bit modulus m, the performing comprising:
multiplying the N-bit scaled reduction parameter by the N-bit scaled result to provide a 2N-bit first product;
shifting the first product by N-bits to provide a shifted first product;
multiplying m by the shifted first product to provide a second product;
subtracting the second product from the N-bit scaled result to provide an intermediate value R;
subtracting m from the intermediate value R while the intermediate value R is greater than m;

providing the intermediate value R as the k-bit result; and storing the k-bit result in a memory for use by a processor.

2. The method of claim 1, further comprising:

aligning the N-bit scaled reduction parameter and the N-bit scaled modulus to a processor data path size to avoid bit shift operations when performing the Barrett Reduction for any arbitrary size of N and k.

3. The method of claim 1, wherein the k-bit result is an element of a prime finite field.

4. The method of claim 3, wherein k is selected from the group consisting of 192, 224, 256, 384 and 521.

5. The method of claim 1, wherein the k-bit result is an element of a characteristic two (binary) finite Galois Field ($2^P$).

6. The method of claim 5, wherein k is selected from the group consisting of 163, 233, 283, 409 and 571.

7. The method of claim 1, wherein the N-bit scaled result is 32-bit aligned.

8. The method of claim 1, wherein N is 512.

9. The method of claim 1, wherein the public key encryption unit comprising a multiplier and a modular math processor.

10. An apparatus comprising:

a public key encryption unit to compute an N-bit scaled reduction parameter based on a k-bit modulus m, N being greater than k and to perform a Barrett Reduction using the N-bit scaled reduction parameter on a N-bit scaled result generated using a N-bit scaled modulus to reduce the N-bit result to a k-bit result with respect to the k-bit modulus m, the public key encryption unit to perform the Barrett Reduction by:

multiplying the N-bit scaled reduction parameter by the N-bit scaled result to provide a first product;

shifting the first product by N-bits to provide a shifted first product;

multiplying m by the shifted first product to provide a second product;

subtracting the second product from the N-bit scaled result to provide an intermediate value R;

subtracting m from the intermediate value R while the intermediate value R is greater than m;

providing the intermediate value R as the k-bit result; and storing the k-bit result in a memory for use by a processor.

11. The apparatus of claim 10, wherein public key encryption unit comprising a multiplier and a modular math processor.

12. The apparatus of claim 10, wherein the public key encryption unit to align the N-bit scaled reduction parameter and the N-bit scaled modulus to a processor data path size to avoid bit shift operations when performing the Barrett Reduction for any arbitrary size of N and k.

13. The apparatus of claim 10, wherein the k-bit result is an element of a prime finite field.

14. The apparatus of claim 13, wherein k is selected from the group consisting of 192, 224, 256, 384 and 521.

15. The apparatus of claim 10, wherein the k-bit result is an element of a characteristic two (binary) finite Galois field ($2^P$).

16. The apparatus of claim 13, wherein k is selected from the group consisting of 163, 233, 283, 409 and 571.

17. The apparatus of claim 10, wherein the N-bit scaled result is 32-bit aligned.

18. The apparatus of claim 10, wherein N is 512.

* * * * *